United States Patent
Grimes et al.

(10) Patent No.: US 12,433,899 B2
(45) Date of Patent: *Oct. 7, 2025

(54) THERAPEUTICS AND METHOD FOR TREATING OSTEOARTHRITIS

(71) Applicant: Calosyn Pharma Inc., Atlanta, GA (US)

(72) Inventors: Reid Grimes, Atlanta, GA (US); David D. Waddell, Shreveport, LA (US)

(73) Assignee: Calosyn Pharma Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,866

(22) Filed: Dec. 27, 2024

(65) Prior Publication Data

US 2025/0120937 A1    Apr. 17, 2025

Related U.S. Application Data

(63) Continuation of application No. 18/681,818, filed as application No. PCT/US2022/039755 on Aug. 8, 2022.

(60) Provisional application No. 63/230,388, filed on Aug. 6, 2021.

(51) Int. Cl.
| | |
|---|---|
| *A61K 31/554* | (2006.01) |
| *A61K 9/50* | (2006.01) |
| *A61K 31/277* | (2006.01) |
| *A61K 31/728* | (2006.01) |
| *A61K 45/06* | (2006.01) |
| *A61P 19/02* | (2006.01) |

(52) U.S. Cl.
CPC ............. *A61K 31/554* (2013.01); *A61K 9/50* (2013.01); *A61K 9/5031* (2013.01); *A61K 31/277* (2013.01); *A61K 31/728* (2013.01); *A61K 45/06* (2013.01); *A61P 19/02* (2018.01)

(58) Field of Classification Search
CPC ...... A61K 31/554; A61K 9/50; A61K 9/5031; A61K 31/277; A61K 31/728; A61K 45/06; A61K 9/0019; A61K 9/1641; A61K 9/1647; A61P 19/02; A61P 29/00; Y02A 50/30

See application file for complete search history.

(56) References Cited

U.S. PATENT DOCUMENTS

| | | |
|---|---|---|
| 8,409,606 B2 | 4/2013 | Sawhney et al. |
| 2006/0270716 A1 | 11/2006 | Waddell |
| 2012/0121711 A1 | 5/2012 | Hu et al. |

FOREIGN PATENT DOCUMENTS

| | | |
|---|---|---|
| WO | 2010017265 A2 | 2/2010 |

OTHER PUBLICATIONS

International Search Report of PCT/US2022/039755, mailed Oct. 28, 2024.

*Primary Examiner* — Robert S Cabral
(74) *Attorney, Agent, or Firm* — Hogan Lovells US LLP

(57) ABSTRACT

Pharmaceutical compositions and methods for treating osteoarthritis in a patient in need thereof comprising administering to the patient an effective dose of a pharmaceutically acceptable composition including a first therapeutic, wherein the first therapeutic includes one or more calcium channel regulators or pharmaceutically acceptable salts, solvates, esters, amides, clathrate, stereoisomers, enantiomers, prodrugs or analogs thereof, and at least a first portion of the first therapeutic is encapsulated in microspheres.

17 Claims, 1 Drawing Sheet

|  | CR-A | V1x | V6x |
|---|---|---|---|
| Tibial cartilage degradation, 3-zone | -13% | -4% | +1% |
| Tibial cartilage degradation; width substantial | -11% | +1% | +6% |
| Femoral cartilage degradation | -30% | -9% | -16% |
| Total Joint Score | -9% | -3% | -2% |
| Sev/marked collagen degradation | -17% | +17% | +12% |
| Normal collagen width | +10%* | -5% | -4% |

TABLE 1
*P< 0.05

CR-A = controlled release verapamil 3ug burst and 0.25ug/d for 20d
V1x = one dose of 3ug verapamil
V6x = 6 doses of 3ug verapamil

THERAPEUTICS AND METHOD FOR TREATING OSTEOARTHRITIS

RELATED APPLICATIONS

This application is a continuation of U.S. patent application Ser. No. 18/681,818 filed Feb. 6, 2024, which is the U.S. National Stage of International Application No. PCT/US2022/039755, filed Aug. 8, 2022, which designates the U.S., published in English, and claims the benefit of U.S. Provisional Patent Application No. 63/230,388, filed Aug. 6, 2021, the entire contents of each of which are incorporated herein by reference.

BACKGROUND

Arthritis is an inflammatory disease characterized by inflammation of a joint, which term includes synovial tissue and membranes. There are many forms of arthritis, including without limitation, osteoarthritis (hypertrophic or degenerative arthritis), rheumatoid arthritis, arthritis due to infection (tuberculosis, Lyme disease, rheumatic fever, etc.), suppurative arthritis, juvenile arthritis, and gouty arthritis. Osteoarthritis is a degenerative joint disease in which cartilage and bone are primarily affected. Osteoarthritis is especially common among older people, and usually affects a joint on one side of the body. In osteoarthritis, the cartilage breaks down and wears away, causing pain, swelling, and loss of motion of the joint.

Approximately 80% of older adults, ages 55 years and older, have evidence of osteoarthritis on X-ray. Of these, an estimated 60% experience symptoms. It is estimated that 240 million adults worldwide have symptomatic osteoarthritis, including more than 30 million U.S. adults. There is no known cure for osteoarthritis, and consequently clinical efforts aimed at treating it are presently directed toward symptomatic relief of pain. Traditional remedies such as the application of heat for temporary, local pain relief are helpful for some patients, and suitable exercise and physical therapy programs can help in maintaining joint mobility. Joint replacement surgery may be advised in severe cases.

Despite the availability of a wide range of medications and treatment modalities for arthritis and inflammatory diseases in general, as described above, none has proved to be entirely satisfactory for osteoarthritis. Treatments and medications that focus on just alleviating pain can carry their own potentially harmful side effects. In particular, there remains a need for innovative treatments that target the underlying cause of osteoarthritis, and thereby help reduce, eliminate, or slow its progression (expressed symptomatically by bone erosion, cartilage erosion, inflammation, swelling, abnormal neovascularization, etc.).

SUMMARY

Wherefore, it is an object of the present invention to overcome the above mentioned shortcomings and drawbacks associated with the current technology.

The presently disclosed invention relates to pharmaceutical compositions and methods for treating osteoarthritis in a patient in need thereof comprising administering to the patient an effective dose of a pharmaceutically acceptable composition including a first therapeutic, wherein the first therapeutic includes one or more calcium channel regulators or pharmaceutically acceptable salts, solvates, esters, amides, clathrate, stereoisomers, enantiomers, prodrugs or analogs thereof, and at least a first portion of the first therapeutic is encapsulated in microspheres. According to a further embodiment, the one or more calcium channel regulator includes one or more of amlodipine, bepridil, diltiazem hypochloride, felodipine, gallopamil, isradipine, nicardipine, nifedipine, nimodipine, nitrendipine, verapamil, devapamil, and emopamil, and the number of distinct calcium channel regulators in the first therapeutic is one of exactly one, two, three, or four. According to a further embodiment, the first therapeutic includes a hydrochloride salt of the one or more calcium channel regulators. According to a further embodiment, the method further comprises injecting the composition into an intraarticular space of a joint of the patient. According to a further embodiment, the joint is one of a hip joint, a joint of a foot and/or an ankle, a knee joint, a joint of a hand, a joint of the spine, and a shoulder joint. According to a further embodiment, the method further comprises injecting the composition in the patient in a single dose of between one 1.00 to 10.00 mL. According to a further embodiment, the composition includes 0.00001-3.0 mg/mL of the first therapeutic. According to a further embodiment, the composition further comprises a vehicle appropriate for injection into the body. According to a further embodiment, the vehicle includes physiological saline. According to a further embodiment, the vehicle further includes a second portion of the first therapeutic not encapsulated in the microspheres. According to a further embodiment, the method further comprises a ratio of the first portion to the second portion is between 0.250 and 4.000. According to a further embodiment, the method further comprises administering a second therapeutic, wherein the second therapeutic is not a calcium channel regulator. According to a further embodiment, the second therapeutic is hyaluronic acid, the second therapeutic is included in the composition, and further comprising injecting the composition into an intraarticular space of a joint of the patient. According to a further embodiment, between 85.0% and 95% of the microspheres are between 6.00 μm and 100.00 μm in diameter. According to a further embodiment, 90.0% of the microspheres are between 20.00 μm and 55.00 μm in diameter. According to a further embodiment, the microspheres are comprised of exactly one, two, or three of poly lactic/glycolic acid (PLGA), polylactic acid (PLA), and polyethylene glycol (PEG). According to a further embodiment, the method further comprises adding saline solution to a plurality of dried microspheres containing either first therapeutic that has been one of freeze dried and vacuum dried or a mixture of each. According to a further embodiment, after administering the composition to the patients the microspheres release in an initial burst between 0.01 μg and 5.00 μg of encapsulated first therapeutic within a time period and then the microspheres release between 0.05 μg and 25.00 μg a day for a second time period, where the first time period is between 0.001 minutes and 1440.000 minutes and the second time period is between 3.0 and 30.0 days. According to a further embodiment, the dosage of the first therapeutic releases at a rate of between 0.20 mg/hr and 0.02 mg/hr. According to a further embodiment, the microspheres are comprised of poly lactic/glycolic acid (PLGA), the first portion is 32 mg of first therapeutic, and the first therapeutic is released from the microspheres at rate of 0.050 and 0.080 mg/hr for a duration of between 3.0-6.0 months.

The presently disclosed invention further relates to methods of treating arthritis and pharmaceutical compositions comprising a plurality of microspheres, between 0.001 mg and 25 mg of a first therapeutic including one or more calcium channel regulators or pharmaceutically acceptable salts, solvates, esters, amides, clathrate, stereoisomers, enantiomers, prodrugs or analogs thereof, at least a first portion of the first therapeutic is one of freeze dried and vacuum dried and the first portion is encapsulated in the microspheres, the calcium channel regulator includes one or more of amlodipine, bepridil, diltiazem hypochloride, felodipine, gallopamil, isradipine, nicardipine, nifedipine, nimodipine, nitrendipine, verapamil, devapamil, and emopamil as a hydrochloride salt, between 85.0% and 95% of the microspheres are between 6.00 μm and 100.00 μm in diameter; and the microspheres are comprised of exactly one, two, or three of poly lactic/glycolic acid (PLGA), poly lactic acid (PLA), and poly ethylene glycol (PEG).

The presently disclosed invention further relates to a kit comprising a first volume containing a plurality of microspheres, between 0.001 mg and 25 mg of a first therapeutic including one or more calcium channel regulators or pharmaceutically acceptable salts, solvates, esters, amides, clathrate, stereoisomers, enantiomers, prodrugs or analogs thereof, at least a first portion of the first therapeutic is one of freeze dried and vacuum dried and the first portion is encapsulated in the microspheres, a second volume containing a second portion of the first therapeutic in a liquid state, and instructions for combining the first volume and the second volume.

The present invention relates to pharmaceutical compositions of a therapeutic (e.g., calcium channel regulators, included encapsulated in microspheres), or a pharmaceutically acceptable salt, solvate, ester, amide, clathrate, stereoisomer, enantiomer, prodrug or analogs thereof, and use of these compositions for the treatment of osteoarthritis, including primary osteoarthritis and secondary osteoarthritis, and osteoarthritis of the hip, osteoarthritis of the foot and/or ankle, osteoarthritis of the knee, osteoarthritis of the hand, Osteoarthritis of the spine, osteoarthritis of the shoulder, cervical osteoarthritis, for example.

In some embodiments, the therapeutic, or a pharmaceutically acceptable salt, solvate, or prodrug thereof, is administered as a pharmaceutical composition that further includes a pharmaceutically acceptable excipient.

In some embodiments, administration of the pharmaceutical composition to a human results in a peak plasma concentration of the therapeutic between 0.05 μM-10 μM (e.g., between 0.05 μM-5 μM).

In some embodiments, the condition is osteoarthritis.

In certain embodiments, the osteoarthritis is mild to moderate osteoarthritis.

In further embodiments, the osteoarthritis is moderate to severe osteoarthritis.

In other embodiments, the therapeutic is administered at a dose that is between 0.05 mg-5 mg/kg weight of the human.

In other embodiments, the pharmaceutical composition is formulated for extended release. In still other embodiments, the pharmaceutical composition is formulated for immediate release. In further embodiments, pharmaceutical composition is formulated for a burst immediate release followed by a lower concentration extended release.

In some embodiments, the pharmaceutical composition is administered concurrently with one or more additional therapeutic agents for the treatment or prevention of the osteoarthritis.

In some embodiments, the therapeutic, or a pharmaceutically acceptable salt, solvate, or prodrug thereof, is administered as a pharmaceutical composition that further includes a pharmaceutically acceptable excipient.

In some embodiments, the peak plasma concentration of the therapeutic is maintained for up to 14 hours. In other embodiments, the peak plasma concentration of the therapeutic is maintained for up to 1 hour.

In some embodiments, administration of the pharmaceutical composition to a human results in a peak synovial fluid concentration of the therapeutic at the joint of injection, at a location proximate to the osteoarthritis, of between 0.05 μM-10 μM (e.g., between 0.05 μM-5 μM).

In some embodiments, the peak synovial fluid concentration at the joint of injection of the therapeutic is maintained for up to 14 hours. In other embodiments, a lower plateau synovial fluid concentration of the therapeutic is maintained for up to 20 days.

In other embodiments, the therapeutic is administered at a dose that is between 0.05 mg-5 mg/kg weight of the human.

In certain embodiments, the pharmaceutical composition is formulated for injection into, for example, the intraarticular space, the spinal lamellae, annulus fibrosus, and/or the nucleus pulposus.

In other embodiments, the pharmaceutical composition is formulated for extended release.

In still other embodiments, the pharmaceutical composition is formulated for immediate release.

As used herein, the term "delayed release" includes a pharmaceutical preparation, e.g., an intraarticular space injected formulation, which spreads into the synovial fluid and releases at a substantially controlled rate. In some embodiments, delayed release of the active agent (e.g., a therapeutic as described herein) results from the active agent being encapsulated in a microsphere.

The term an "effective amount" of an agent, as used herein, is that amount sufficient to effect beneficial or desired results, such as clinical results, and, as such, an "effective amount" depends upon the context in which it is being applied.

The terms "extended release" or "sustained release" interchangeably include a drug formulation that provides for gradual release of a drug over an extended period of time, e.g., 6-12 hours, 1 to 25 days or more, compared to an immediate release formulation of the same drug. Preferably, although not necessarily, results in substantially constant blood levels of a drug over an extended time period that are within therapeutic levels and fall within a peak plasma concentration range that is between, for example, 0.05-10 μM, 0.1-10 μM, 0.1-5.0 μM, or 0.1-1 μM.

As used herein, the terms "formulated for enteric release" and "enteric formulation" include pharmaceutical compositions, e.g., oral dosage forms, for oral administration able to provide protection from dissolution in the high acid (low pH) environment of the stomach. Enteric formulations can be obtained by, for example, incorporating into the pharmaceutical composition a polymer resistant to dissolution in gastric juices. In some embodiments, the polymers have an optimum pH for dissolution in the range of approx. 5.0 to 7.0 ("pH sensitive polymers"). Exemplary polymers include methacrylate acid copolymers that are known by the trade name Eudragit® (e.g., Eudragit® L100, Eudragit® S100, Eudragit® L-30D, Eudragit® FS 30D, and Eudragit® L100-55), cellulose acetate phthalate, cellulose acetate trimellitiate, polyvinyl acetate phthalate (e.g., Coateric®), hydroxyethylcellulose phthalate, hydroxypropyl methylcellulose phthalate, or shellac, or an aqueous dispersion thereof. Aqueous dispersions of these polymers include dispersions of cellulose acetate phthalate (Aquateric®) or shellac (e.g., MarCoat 125 and 125N). An enteric formulation reduces the percentage of the administered dose released into the stomach by at least 50%, 60%, 70%, 80%, 90%, 95%, or even 98% in comparison to an immediate release formulation. Where such a polymer coats a tablet or capsule, this coat is also referred to as an "enteric coating."

The term "immediate release" includes where the agent (e.g., therapeutic), as formulated in a unit dosage form, has a dissolution release profile under in vitro conditions in which at least 55%, 65%, 75%, 85%, or 95% of the agent is released within the first two hours of administration to, e.g., a human. Desirably, the agent formulated in a unit dosage has a dissolution release profile under in vitro conditions in which at least 50%, 65%, 75%, 85%, 90%, or 95% of the agent is released within the first 30 minutes, 45 minutes, or 60 minutes of administration.

The term "pharmaceutical composition," as used herein, includes a composition containing a compound described herein (e.g., calcium channel regulators, included encapsulated in microspheres, or any pharmaceutically acceptable salt, solvate, or prodrug thereof), formulated with a pharmaceutically acceptable excipient, and typically manufactured or sold with the approval of a governmental regulatory agency as part of a therapeutic regimen for the treatment of disease in a mammal.

Pharmaceutical compositions can be formulated, for example, for topical administration (e.g., as a cream, gel, lotion, or ointment); for intravenous administration (e.g., as a sterile solution free of particulate emboli and in a solvent system suitable for intravenous use); or in any other formulation described herein.

A "pharmaceutically acceptable excipient," as used herein, includes any ingredient other than the compounds described herein (for example, a vehicle capable of suspending or dissolving the active compound) and having the properties of being nontoxic and non-inflammatory in a patient. Excipients may include, for example: antiadherents, antioxidants, binders, coatings, compression aids, disintegrants, dyes (colors), emollients, emulsifiers, fillers (diluents), film formers or coatings, flavors, fragrances, glidants (flow enhancers), lubricants, preservatives, printing inks, sorbents, suspending or dispersing agents, sweeteners, or waters of hydration. Exemplary excipients include, but are not limited to: butylated hydroxytoluene (BHT), calcium carbonate, calcium phosphate (dibasic), calcium stearate, croscarmellose, cross-linked polyvinyl pyrrolidone, citric acid, crospovidone, cysteine, ethylcellulose, gelatin, hydroxypropyl cellulose, hydroxypropyl methylcellulose, lactose, magnesium stearate, maltitol, maltose, mannitol, methionine, methylcellulose, methyl paraben, microcrystalline cellulose, polyethylene glycol, polyvinyl pyrrolidone, povidone, pregelatinized starch, propyl paraben, retinyl palmitate, shellac, silicon dioxide, sodium carboxymethyl cellulose, sodium citrate, sodium starch glycolate, sorbitol, starch (corn), stearic acid, stearic acid, sucrose, talc, titanium dioxide, vitamin A, vitamin E, vitamin C, and xylitol.

The term "pharmaceutically acceptable prodrugs" as used herein, includes those prodrugs of the compounds of the present invention which are, within the scope of sound medical judgment, suitable for use in contact with the tissues of humans and animals with undue toxicity, irritation, allergic response, and the like, commensurate with a reasonable benefit/risk ratio, and effective for their intended use, as well as the zwitterionic forms, where possible, of the compounds of the invention.

The term "pharmaceutically acceptable salt," as use herein, includes those salts which are, within the scope of sound medical judgment, suitable for use in contact with the tissues of humans and animals without undue toxicity, irritation, allergic response and the like and are commensurate with a reasonable benefit/risk ratio, especially hydrochloride salts of the described therapeutics. Pharmaceutically acceptable salts are well known in the art. For example, pharmaceutically acceptable salts are described in: Berge et al., *J. Pharmaceutical Sciences* 66:1-19, 1977 and in *Pharmaceutical Salts: Properties, Selection, and Use*, (Eds. P. H. Stahl and C. G. Wermuth), Wiley-VCH, 2008. The salts can be prepared in situ during the final isolation and purification of the compounds of the invention or separately by reacting the free base group with a suitable organic or inorganic acid. Representative acid addition salts include acetate, adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, fumarate, glucoheptonate, glycerophosphate, hemisulfate, heptonate, hexanoate, hydrobromide, hydrochloride, hydroiodide, 2-hydroxyethanesulfonate, lactobionate, lactate, laurate, lauryl sulfate, malate, maleate, malonate, methanesulfonate, 2-naphthalenesulfonate, nicotinate, oleate, oxalate, palmitate, pamoate, pectinate, persulfate, 3-phenylpropionate, phosphate, picrate, pivalate, propionate, stearate, succinate, sulfate, tartrate, thiocyanate, toluenesulfonate, undecanoate, valerate salts, and the like. Representative alkali or alkaline earth metal salts include sodium, lithium, potassium, calcium, magnesium, and the like, as well as nontoxic ammonium, quaternary ammonium, and amine cations, including, but not limited to ammonium, tetramethylammonium, tetraethylammonium, methylamine, dimethylamine, trimethylamine, triethylamine, ethylamine, and the like.

The terms "pharmaceutically acceptable solvate" or "solvate," as used herein, includes a compound of the invention wherein molecules of a suitable solvent are incorporated in the crystal lattice. A suitable solvent is physiologically tolerable at the administered dose. For example, solvates may be prepared by crystallization, recrystallization, or precipitation from a solution that includes organic solvents, water, or a mixture thereof. Examples of suitable solvents are ethanol, water (for example, mono-, di-, and tri-hydrates), N-methylpyrrolidinone (NMP), dimethyl sulfoxide (DMSO), N,N'-dimethylformamide (DMF), N,N'-dimethylacetamide (DMAC), 1,3-dimethyl-2-imidazolidinone (DMEU), 1,3-dimethyl-3,4,5,6-tetrahydro-2-(1H)-pyrimidinone (DMPU), acetonitrile (ACN), propylene glycol, ethyl acetate, benzyl alcohol, 2-pyrrolidone, benzyl benzoate, and the like. When water is the solvent, the solvate is referred to as a "hydrate."

The term "prevent," as used herein, includes prophylactic treatment or treatment that prevents one or more symptoms or conditions of a disease, disorder, or conditions described herein (e.g., osteoarthritis). It is to be appreciated that osteoarthritis is a disease that can develop over the course of many years, with a significant amount of that time having little or no symptoms or pain. During the period of pre-symptomatic disease, gross changes are occurring in the joint. Treatment can be initiated, for example, prior to ("pre-exposure prophylaxis") or following ("post-exposure prophylaxis") a diagnosis of the disease, disorder, or conditions. Treatment that includes administration of a compound of the invention, or a pharmaceutical composition thereof, can be acute, short-term, or chronic. The doses administered may be varied during the course of preventive treatment.

The term "prodrug," as used herein, includes compounds which are rapidly transformed in vivo to the parent compound of the above formula. Prodrugs also encompass bioequivalent compounds that, when administered to a human, lead to the in vivo formation of therapeutic. A thorough discussion is provided in T. Higuchi and V. Stella, Pro-drugs as Novel Delivery Systems, Vol. 14 of the A.C.S. Symposium Series, and Edward B. Roche, ed., Bioreversible Carriers in Drug Design, American Pharmaceutical Association and Pergamon Press, 1987, each of which is incorporated herein by reference. Preferably, prodrugs of the compounds of the present invention are pharmaceutically acceptable.

As used herein, and as well understood in the art, "treatment" includes an approach for obtaining beneficial or desired results, such as clinical results. Beneficial or desired results can include, but are not limited to, alleviation or amelioration of one or more symptoms or conditions; diminishment of extent of disease, disorder, or condition; stabilized (i.e. not worsening) state of disease, disorder, or condition; preventing spread of disease, disorder, or condition; delay or slowing the progress of the disease, disorder, or condition; amelioration or palliation of the disease, disorder, or condition; and remission (whether partial or total), whether detectable or undetectable. "Treatment" can also mean prolonging survival as compared to expected survival if not receiving treatment. As used herein, the terms "treating" and "treatment" can also include delaying the onset of, impeding or reversing the progress of, or alleviating either the disease or condition to which the term applies, or one or more symptoms of such disease or condition.

The term "unit dosage forms" includes physically discrete units suitable as unitary dosages for human subjects and other mammals, each unit containing a predetermined quantity of active material calculated to produce the desired therapeutic effect, in association with any suitable pharmaceutical excipient or excipients.

As used herein, the term "plasma concentration" includes the amount of therapeutic present in the plasma of a treated subject (e.g., as measured in a rabbit using an assay described below or in a human).

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention, in which FIG. 1 is a table showing results of an experiment described herein. The invention will now be described, by way of example, with reference to the accompanying drawings.

DETAILED DESCRIPTION

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The terms "comprise(s)," "include(s)," "having," "has," "can," "contain(s)," and grammatical equivalents and variants thereof, as used herein, are intended to be open-ended transitional phrases, terms, or words that do not preclude the possibility of additional acts or structures, are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. The singular forms "a," "and" and "the" include plural references unless the context clearly dictates otherwise. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The embodiments set forth the below represent the necessary information to enable those skilled in the art to practice the invention and illustrate the best mode of practicing the invention. For the measurements listed, embodiments including measurements plus or minus the measurement times 5%, 10%, 20%, 50% and 75% are also contemplated. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

In addition, the invention does not require that all the advantageous features and all the advantages of any of the embodiments need to be incorporated into every embodiment of the invention.

Turning now to the attached Fig, a brief description concerning the various components of the present invention will now be briefly discussed.

The presently disclosed invention utilizes calcium-channel blockers or regulators, preferably at least partially encapsulated in microparticles (such as microspheres) as a part of a therapeutic for osteoarthritis.

Calcium Channel Regulators. Representative examples of calcium-channel blockers or regulators that may be used include amlodipine, bepridil, diltiazem hypochloride, felodipine, gallopamil, isradipine, nicardipine, nifedipine, nimodipine, nitrendipine, verapamil, devapamil; and emopamil and mixtures thereof, and pharmaceutically acceptable salts, solvates, esters, amides, clathrates, stereoisomers, enantiomers, prodrugs or analogs thereof, as well as specific antibodies against the channels. As the name implies, calcium-channel blockers or regulators respectively block or regulate the movement of calcium ions through ion channels in the membranes of cells. A "specific antibody against the channel" means an antibody against an antigenic determinant of the ion-channel protein that is capable of blocking the function of the ion channel when the antibody binds to the antigenic determinant. A detailed description of a selection of the representative calcium-channel blockers or regulators, with noteworthy enantiomers and salts follow.

Verapamil has (+) and (−)/(R) and (S) enantiomers. (−)-Verapamil, or (S)-verapamil is also known as 2-(3,4-dimethoxyphenyl)-5-{[2-(3,4-dimethoxyphenyl)ethyl](methyl)amino}-2-(propan-2-yl)pentanenitrile that has S configuration. It is a conjugate base of a (S)-verapamil(1+). It is an enantiomer of a dexverapamil. (−)-Verapamil has a molecular formula of $C_{27}H_{38}N_2O_4$, and a chemical structure of:

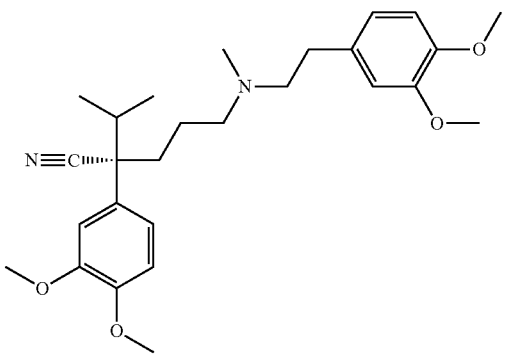

Dexverapamil, also known as (R)-, (+)-verapamil, is a 2-(3,4-dimethoxyphenyl)-5-{[2-(3,4-dimethoxyphenyl)ethyl](methyl)amino}-2-(propan-2-yl)pentanenitrile that has R configuration. Dexverapamil is a conjugate base of a dexverapamil(1+), and is an enantiomer of (S)-verapamil. Dexverapamil has a molecular formula of $C_{27}H_{38}N_2O_4$ and has a chemical structure of:

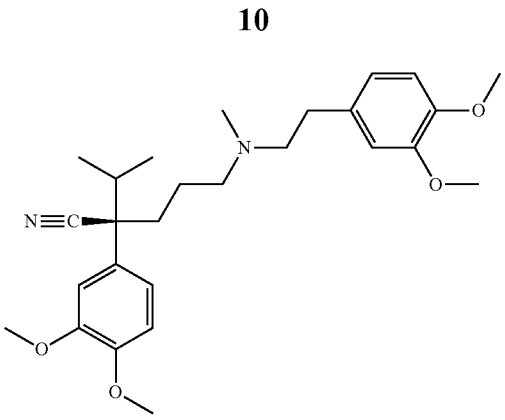

Verapamil hydrochloride is the hydrochloride salt of verapamil, and also has (+) and (−)/(R) and (S) enantiomers. Verapamil hydrochloride has a molecular formula of $C_{27}H_{39}ClN_2O_4$.

Devapamil, also known as desmethoxyverapamil, is a phenylalkylamine (PAA) derivative and has (+) and (−)/(R) and (S) enantiomers.

(−)-Devapamil, is also known as (S)-devapamil and (2S)-2-(3,4-dimethoxyphenyl)-5-[2-(3-methoxyphenyl) ethylmethylamino]-2-propan-2-ylpentanenitrile. (−)-Devapamil has a molecular formula of $C_{26}H_{36}N_2O_3$, and has a chemical structure of:

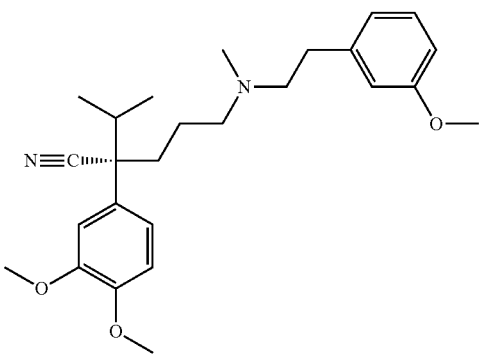

(+)-Devapamil, is also known as (R)-devapamil and (2R)-2-(3,4-dimethoxyphenyl)-5-[2-(3-methoxyphenyl)ethylmethylamino]-2-propan-2-ylpentanenitrile, has a molecular formula of $C_{26}H_{36}N_2O_3$, and has a chemical structure of

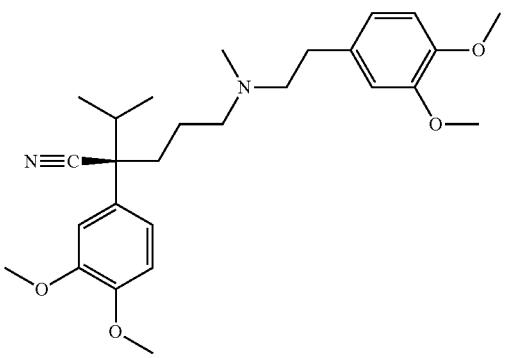

Devapamil hydrochloride is the hydrochloride salt of Devapamil, and also has (+) and (−)/(R) and (S) enantiomers.

Emopamil has (+) and (−)/(R) and (S) enantiomers. Emopamil also known as 5-[methyl(2-phenylethyl)amino]-2-phenyl-2-propan-2-ylpentanenitrile, has a Molecular Formula of $C_{23}H_{39}N_2$

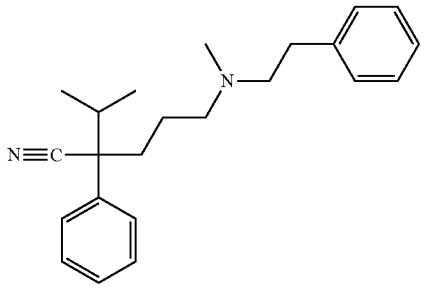 [SMILES: CC(C)C(C#N)(CCCN(C)CCc1ccccc1)c1ccccc1]

Emopamil hydrochloride, (S), is also know as levoemopamil hydrochloride and (2S)-5-[methyl(2-phenylethyl)amino]-2-phenyl-2-propan-2-ylpentanenitrile, hydrochloride, and has a molecular formula of $C_{23}H_{31}ClN_2$.

Emopamil hydrochloride, (R), is also know as benzeneacetonitrile, alpha-(1-methylethyl)-alpha-(3-(methyl(2-phenylethyl)amino)propyl), -monohydrochloride, (R)-, and has a molecular formula of $C_{23}H_{31}ClN_2$.

Nifedipine is a dihydropyridine calcium channel blocking agent also known as dimethyl 2,6-dimethyl-4-(2-nitrophenyl)-1,4-dihydropyridine-3,5-dicarboxylate. Nifedipine has a molecular formula of $C_{17}H_{18}N_2O_6$, and a chemical structure of:

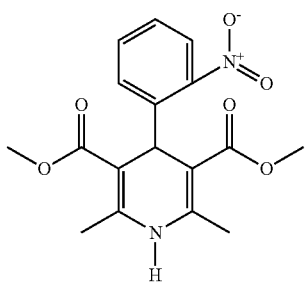

Nifedipine hydrochloride is the hydrochloride salt of nifedipine and has the molecular formula of $C_{17}H_{19}ClN_2O_6$.

Diltiazem is a 5-[2-(dimethylamino)ethyl]-2-(4-methoxyphenyl)-4-oxo-2,3,4,5-tetrahydro-1,5-benzothiazepin-3-yl acetate in which both stereocentres have S configuration. It is a conjugate base of a diltiazem(1+), and is an enantiomer of an ent-diltiazem. Diltiazem has a molecular formula of $C_{22}H_{26}N_2O_4S$, and has a chemical structure of:

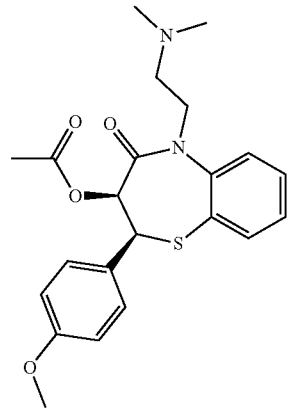 [SMILES: COc1ccc([C@@H]2Sc3ccccc3N(CCN(C)C)C(=O)[C@@H]2OC(C)=O)cc1]

Ent-diltiazem is a 5-[2-(dimethylamino)ethyl]-2-(4-methoxyphenyl)-4-oxo-2,3,4,5-tetrahydro-1,5-benzothiazepin-3-yl acetate in which both stereocentres have R configuration. It is a conjugate base of an ent-diltiazem(1+) and an enantiomer of a diltiazem. Ent-diltiazem has a molecular formula of $C_{22}H_{26}N_2O_4S$ and has a chemical structure of:

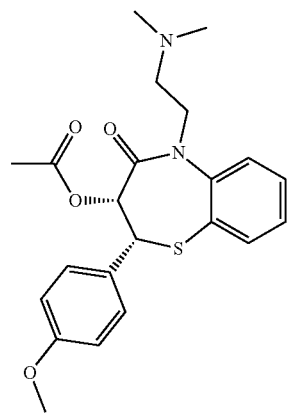 [SMILES: COc1ccc([C@H]2Sc3ccccc3N(CCN(C)C)C(=O)[C@H]2OC(C)=O)cc1]

Diltiazem hydrochloride is the hydrochloride salt of diltiazem and has the molecular formula of $C_{22}H_{27}ClN_2O_4S$ Microspheres: Microspheres are homogeneous, monolithic particles in the size range of about 1-300 μm. Administration of drugs in the form of microspheres provides the option to localizes the API at the site of action and by prolonging drug release. Calcium channel blocker microspheres: The presently disclosed invention conceives delivering microspheres loaded with calcium channel regulator into the joints of patients suffering from osteoarthritis. The inventors tested the efficacy of this method, and this novel method of delivering the therapeutic.

Experiment 1. To summarize, referring to FIG. 1, a dose of controlled release of verapamil microspheres was injected in osteoarthritic model mice knee joints. Other test groups included verapamil and diltiazem, alone or in combination, not encapusalted in microspheres. The microsphere loaded with verapamil was referred to as "controlled release" verapamil or "CR." As shown in FIG. 1, CR-A (controlled release verapamil 3 μg burst and 0.25 μg/d 20d) reduced tibial cartilage degradation by 13% verses one dose of 3 ug verapamil (4%) or 6 doses (no reduction). In addition, CR-A increased the amount of normal collagen whereas this was not seen with either 1× or 6× verapamil. The above results while not robust (variability of the model) point to potential advantages of the controlled release formulation. No increased inflammation was seen when normal rat knees were injected with CR-A.

Introduction: A study was done to determine the efficacy of Verapamil and Diltiazem, alone or in combination, in inhibiting lesions of medial meniscal tear-induced cartilage degeneration in rats. Additional trials with CR verapamil were performed to see if there was any benefit to loading the calcium channel regulator in a microparticle.

Unilateral medial meniscal tear in 275-300 gram rats will result in rapidly progressive cartilage degenerative changes characterized by chondrocyte and proteoglycan loss, fibrillation, osteophyte formation and chondrocyte cloning (1, 2, 7). Utilization of younger rats (without tidemark) results in lesions more typical of those seen in osteochondrosis and extremely large osteophytes. This model is performed by transection of the medial collateral ligament just below its attachment to the meniscus so that when the joint space opens, the meniscus is reflected toward the femur. The meniscus is cut at its narrowest point (away from the ossicles) taking care not to damage the tibial surface and making sure that the resulting transection produces separate, freely movable anterior and posterior meniscus halves.

Progressive cartilage degenerative changes occur and by 3-6 weeks post-surgery, tibial cartilage degeneration may be focally severe on the outer ⅓ of the tibia with degenerative changes of lesser severity in the middle and inner ⅓. Osteophytes are ultimately quite large (medial tibia) and progressively increase in size. The model is progressive and results in total cartilage loss (to eburnated bone) in 12 months in virtually all rats, with lesions that are reasonably consistent. Rats resume weight bearing immediately post-surgery and gait analysis suggests little if any change in load bearing of the operated knee. Due to the rapid progression of cartilage degeneration, protective effects are not always apparent in the outer ⅓ of the tibial cartilage, although zonal analysis may reveal effects of treatment in the middle and inner ⅓. Substantial subchondral and epiphyseal bone changes occur in the medial tibia subjacent to the areas of greatest lesion severity. These range in magnitude and type from increased basophilia of the calcified cartilage layer with small fractures into subchondral bone to overt collapse of articular cartilage into areas of bone resorption in the epiphysis with surrounding sclerosis of bone. Therefore, this model offers the opportunity to evaluate not only chondroprotective effects of agents but also bone preserving activities.

The model is of relatively short duration and animals are very consistent in their response to the surgery. Broad-spectrum matrix metalloproteinases (MMPs) inhibitors are consistently active in this model. This model has also been used to evaluate repair strategies. Evaluation of repair strategies in rodent models must always take into consideration the marked tendency for rodent marginal zones and pleuripotential marrow cells to proliferate to various irritant stimuli.

Test Article Identification and Preparation: Verapamil and Diltiazem were used for formulation for dosing.

Test System Identification: Male Lewis rats weighing 274-312 grams (mean 289) on day 0 were obtained from Charles River Labs. Animals were identified by a distinct mark at the base of the tail delineating group and animal number. After randomization, all cages were labeled with protocol number, group numbers, and animal numbers with appropriate color-coding.

Environment and Husbandry: Upon arrival, animals were housed 4/cage in shoe-box polycarbonate cages with wire tops, wood chip bedding and suspended food and water bottles. The cages conformed to the guidelines cited in the Guide for the Care and Use of Laboratory Animals.

Animals were acclimated for 7 days prior to being randomized into groups. An attending veterinarian was on site or on call during the live phase of the study, and no concurrent medications were given. During the acclimation and study periods, animals were housed in a laboratory environment with temperatures ranging between 67-76° F. and relative humidity between 30-70%. Automatic timers provided 12 hours of light and 12 hours of dark. Animals were allowed access ad libitum to Harlan Teklad Rodent Chow and fresh municipal tap water.

Animal care, including room, cage, and equipment sanitation conformed to the guidelines cited in the Guide for the Care and Use of Laboratory Animals.

Experimental Design: Animals were anesthetized with Isoflurane and the right knee area was prepared for surgery. A skin incision was made over the medial aspect of the knee and the medial collateral ligament was exposed by blunt dissection, and then transected. The medial meniscus was cut through the full thickness to simulate a complete tear. Skin and subcutis were closed with 4-0 Vicryl suture. Dosing by the intra-articular (IA) route began four days after surgery and continued as indicated below until day 24. Treatment groups were as follows:

| Group | N | Treatment |
|---|---|---|
| 1 | 15 | Surgery + Saline Day 4 (#1-8), and Days |
| 2 | 15 | Surgery + V + D (3 µg each) Days 4, 8, 12, 16, 20, 24 |
| 3 | 15 | Surgery + V (3 µg) Day 4, Saline Days 8, 12, 16, 20, 24 |
| 4 | 15 | Surgery + V (3 µg) days 4, 8, 12, 16, 20, 24 |
| 5 | 15 | Surgery + D (3 µg) days 4, 8, 12, 16, 20, 24 |
| 6 | 15 | Surgery + V A-CR (GJ121008) Day 4 |
| 7 | 5 | Normal + V A-CR (GJ121008) Day 4 (Rt), Day 25 |
| 8 | 15 | Surgery + V B-CR (GJ121808) Day 4 |
| 9 | 5 | Normal + V B-CR (GJ121808) Day 4 (Rt), Day 25 (Lt) |

At necropsy, the right (operated) knee joint from all animals and the left from animals 1-5 of group 1 were trimmed of muscle and connective tissue and collected into 10% neutral buffered formalin. The patella was removed to allow proper fixation of the joints.

Observations, Measurements, and Specimens: Rats were observed daily for abnormal swelling or gait alterations. Serum was collected at necropsy. Right knees were lavaged with 100 µl of saline and patellae were collected and frozen. Left (unoperated) knees were also lavaged and left patellae were collected from animals 1-5 of group 1. Samples were frozen for shipment to sponsor. Weight bearing (left vs. right) was recorded on days 7 and 27 using an incapacitance meter and the following method:

On the days of evaluation for pain, animals were placed in the plexiglass housing of the incapacitance meter and allowed to acclimate for approximately 2-5 minutes. The position of the animal was such that each hind paw rested on a separate force plate. The force exerted on each plate was measured three times, and each measurement was the average force over the course of three seconds. The mean of these three readings constituted 1 data point. All measurements were used, regardless of whether the value was positive (leaning to the left) or negative (leaning toward the right). Right paw force was compared to left for each group to confirm that animals were showing pain. Difference in force (left minus right) was determined both as an absolute value and as a percentage of the total hind leg force and compared between groups, as was the percentage of the total body weight that was carried on the hind legs.

Morphologic Pathology Methods: Following three days in 10% formic acid decalcifier, the operated joints were cut into two approximately equal halves in the frontal plane and embedded in paraffin. Three sections were cut from each operated knee at approximately 200 µm steps and stained with toluidine blue. A single section was cut from each unoperated knee. A total of 335 toluidine blue sections (105 operated knees×3+20 non-surgery knees) were prepared for this study.

All three sections of each knee were analyzed microscopically. In scoring the three sections, the worst-case scenario for the two halves on each slide was determined for general cartilage degeneration, proteoglycan loss, collagen damage, and osteophyte formation. The values for each parameter were then averaged across the 3 sections to determine overall subjective scores. In addition, for some parameters (noted below), regional differences across the tibial plateau were taken into consideration by dividing each section into three zones (1-outside, 2-middle, 3-inside). In the surgical OA model, the outside (z1) and middle (z2) thirds are most severely affected, and milder changes are present on the inside third (z3). When zones are scored individually, scores are assigned based on % area of the zone affected. Zone areas are delineated using an ocular micrometer.

The following parameters were measured and/or scored:
General cartilage degeneration includes the important parameters of chondrocyte death/loss, proteoglycan loss, and collagen loss or fibrillation. Cartilage degeneration in the tibia was scored none to severe (numerical values 0-5) for each zone (area defined by micrometer) using the following criteria:
  0=no degeneration
  1=minimal degeneration, within the zone 5-10% of the matrix appears non viable as a result of significant chondrocyte loss (greater than 50% of normal cell density). PG loss is usually present in these areas of cell loss and collagen matrix loss may be present
  2=mild degeneration, within the zone 11-25% of the matrix appears non viable as a result of significant chondrocyte loss (greater than 50% of normal cell density). PG loss is usually present in these areas of cell loss and collagen matrix loss may be present
  3=moderate degeneration, within the zone 26-50% of the matrix appears non viable as a result of significant chondrocyte loss (greater than 50% of normal cell density). PG loss is usually present in these areas of cell loss and collagen matrix loss may be present
  4=marked degeneration, within the zone 51-75% of the matrix appears non viable as a result of significant chondrocyte loss (greater than 50% of normal cell density). PG loss is usually present in these areas of cell loss and collagen matrix loss may be present.
  5=severe degeneration, within the zone 76-100% of the matrix appears non viable as a result of significant chondrocyte loss (greater than 50% of normal cell density). PG loss is usually present in these areas of cell loss and collagen matrix loss may be present.

A 3-zone sum for cartilage degeneration was also calculated. The same process was applied to evaluation of the femoral cartilage with the exception that lesions were not analyzed based on zones since the lesions aren't generally distributed over the surface in a zonal pattern. The total width of the load-bearing surface (approximately 2000 µm for the femur) was determined and the above criteria were applied to the most severely affected ⅓, ⅔ or 3/3. For example, if ⅓ of the total area (lesion may be in the center of the plateau covering about 667 µm) has minimal degeneration (5-10% of total area has loss of chondrocytes and/or matrix), a score of 1 is assigned. If that minimal degeneration extends over the entire surface (3/3) then the score is 3. If the entire femoral cartilage is absent as a result of severe diffuse degeneration, then the score is 15.

In addition to this overall cartilage degeneration score, collagen matrix damage was scored separately in order to identify more specific effects of agents.

Collagen damage across the medial tibial plateau (most severely affected section of the two halves) was quantified by measuring the total width of the following:
  Any damage (fibrillation ranging from superficial to full thickness loss).
  Severe damage (total or near total loss of collagen to tidemark, >90% thickness)
  Marked damage (extends through 61-90% of the cartilage thickness)
  Moderate damage (extends thru 31-60% of the cartilage thickness)
  Mild damage (extends through 11-30% of the cartilage thickness)
  Minimal damage (very superficial, affecting upper 10% only)

In addition to the above subjective general cartilage scoring, two cartilage degeneration width measurements were taken:

Total Tibial Cartilage Degeneration Width (m) is a micrometer measurement of total extent of tibial plateau affected by any type of degeneration (cell loss, proteoglycan loss or collagen damage). This measurement extends from the origination of the osteophyte with adjacent cartilage degeneration (outside ⅓) across the surface to the point where tangential layer and underlying cartilage appear histologically normal.

Substantial Cartilage Degeneration Width (m) reflects areas of tibial cartilage degeneration in which both chondrocyte and proteoglycan loss extend through greater than 50% of the cartilage thickness. In general, the collagen damage is mild (25% depth) or greater for this parameter, but chondrocyte and proteoglycan loss extend to at least 50% or greater of the cartilage depth.

A micrometer depth of any type of lesion (both chondrocyte and proteoglycan loss, but may have good retention of collagenous matrix and no fibrillation), expressed as a ratio of depth of changed area vs. depth to tidemark, was taken in the area of greatest lesion severity in each of the 3 zones across the tibial surface at the midpoint of the zone. This measurement is the most critical analysis of any type of microscopic change present. The denominator can serve as an average measure of cartilage thickness in each of the 3 zones for comparison of anabolics when measures are taken at the midpoint of the zone.

Scoring of the osteophytes and categorization into small, medium and large was done with an ocular micrometer. Marginal zone proliferative changes are 200 µm in order to be measured and designated as osteophytes. Scores are assigned to the largest osteophyte in each section (typically found in the tibia) according to the following criteria:
  1=small up to 299 µm
  2=moderate 300-399 µm
  3=large 400-499 µm
  4=very large 500-599
  5=very large !600

The actual osteophyte measurement (tidemark to furthest distance point extending toward synovium) was also recorded.

The femoral cartilage degeneration score and the 3-zone sum of the tibial cartilage degeneration scores (mean of 3 levels) were summed to create a total cartilage degeneration score. The mean osteophyte score for each joint was added to this value to create a total joint score.

Image analysis: In order to quantitate and compare the cartilage matrix preservation, cartilage area measurements were taken from the most severely affected section of each animal. Photomicrographs were taken with a CoolSNAP-Pro microscope camera and loaded into ImagePro Plus software. The following measurements were taken from tracings of these photomicrographs:
1. Total area from the tidemark to the surface (or projected surface in degenerated areas) over 6 cm (2 zones) of the tibial plateau, measured from the inner edge of the osteophyte
2. Area of non-viable matrix (cartilage with less than 50% chondrocytes, proteoglycan, and intact collagen) and no matrix within the total area
3. Area of no matrix within the total area, The area of non-viable matrix was subtracted from the total area to get the area of viable matrix, and the area of no matrix was subtracted from the total area to get the area of any matrix (collagen matrix with or without chondrocytes and proteoglycan). These two values were then compared back to the total area to derive the percent viable matrix area and the percent any matrix area, which were compared between groups.

Synovial reaction, if abnormal, was described (should be mainly fibrosis) and characterized with respect to inflammation type and degree but was not included in the score.

Damage to the calcified cartilage layer and subchondral bone (worst case scenario for all sections) was scored using the following criteria:
0=No changes
1=Increased basophilia at tidemark, no fragmentation of tidemark, no marrow changes or if present minimal and focal
2=Increased basophilia at tidemark, minimal to mild focal fragmentation of calcified cartilage of tidemark, mesenchymal change in marrow involves ¼ of total area but generally is restricted to subchondral region under lesion
3=Increased basophilia at tidemark, mild to marked focal or multifocal fragmentation of calcified cartilage (multifocal), mesenchymal change in marrow is up to ¾ of total area, areas of marrow chondrogenesis may be evident but no major collapse of articular cartilage into epiphyseal bone (definite depression in surface)
4=Increased basophilia at tidemark, marked to severe fragmentation of calcified cartilage, marrow mesenchymal change involves up to ¾ of area and articular cartilage has collapsed into the epiphysis to a depth of 250 !m or less from tidemark (see definite depression in surface cartilage)
5=Increased basophilia at tidemark, marked to severe fragmentation of calcified cartilage, marrow mesenchymal change involves up to ¾ of area and articular cartilage has collapsed into the epiphysis to a depth of greater than 250 μm from tidemark. A treatment group Mean±SE for each score and measurement was determined.

Animal Disposition: Animal carcasses were disposed of according to Bolder BioPATH procedures.

Statistical Analysis: Statistical analysis of histopathology parameters was done by comparing group values using the Student's two-tailed t-test with significance set at p #0.05. Specimen and Raw Data Storage Statement of Effect of Deviations on the Quality and Integrity of the Study: There were no deviations from the protocol.

Results: Live Phase Parameters. All animals resumed weight bearing immediately post surgery upon recovery from anesthesia and there was no evidence of excessive post-operative swelling indicative of joint infection. Animals given Verapamil+Diltiazem Q4D gained significantly less weight than the vehicle control. Left legs bore significantly more weight than right legs for all surgery groups at both time points.

Animals treated with Verapamil Q4D bore significantly more weight on the right legs compared to the Q4D vehicle controls on day 27. This was true when data was evaluated both as a ratio of left to right weight bearing and as a percentage of hind leg force. There were no other significant differences between surgery groups and the vehicle controls.

Morphologic Pathology: Vehicle control animals dosed Q4D on days 4-24 had cartilage degeneration that was most severe in the outer ⅔ of the medial tibia and least severe on the inner ⅓. Osteophytes were present in all animals and were large to very large, with a mean measurement of 470 μm. Femoral cartilage degeneration was present in six of seven animals and had a mean score of 1.62. The total joint score was 9.81. Vehicle control animals dosed on day 4 only had generally more severe lesions, which were significantly different from the Q4D controls for tibial cartilage degeneration (zone 2 and total), substantial cartilage degeneration widths, and the total joint score without the femur.

Animals given Verapamil+Diltiazem Q4D were similar to the Q4D controls for general pathology parameters, with a 1% decrease in the total joint score. The width of marked collagen degeneration was significantly decreased by 90%, although collagen degeneration was not significantly affected otherwise. Cartilage areas were similar to the controls.

Animals given Verapamil on day 4 and saline Q4D on days 8-24 were similar to the Q4D controls for general pathology parameters, with a 3% decrease in the total joint score. Collagen degeneration widths and cartilage areas were similar to the controls.

Animals given Verapamil Q4D were similar to the Q4D controls for general pathology parameters, with a 2% decrease in the total joint score. Collagen degeneration widths and cartilage areas were similar to the controls.

Animals given Diltiazem Q4D were similar to the Q4D controls for general pathology parameters, with a 6% decrease in the total joint score. Collagen degeneration widths and cartilage areas were similar to the controls.

Animals given controlled release Verapamil formulation A (GJ121008) with an injection on day 4 were similar to the day 4 controls for general pathology parameters, with an 8% decrease in the total joint score. Collagen degeneration widths and cartilage areas were similar to the controls.

Animals given controlled release Verapamil formulation B (GJ121808) with an injection on day 4 were similar to the day 4 controls for general pathology parameters, with a 5% decrease in the total joint score. The width of mild collagen degeneration was significantly decreased by 40%, although collagen degeneration was not significantly affected otherwise. Cartilage areas were similar to the controls.

Non-surgery knees injected with controlled release Verapamil on day 4 (right) or 25 (left) had no cartilage lesions with the exception with one right knee from an animal given formulation A (GJ121008), which had minimal degeneration in zone 3 of the tibia. This is likely a spontaneous change. Minimal to mild subacute inflammation was seen in the majority of the knees injected on day 4 (right) from non-surgery animals and minimal to mild acute inflammation or synovitis was seen in the majority of the knees injected on day 2.

As shown in FIG. 1, Thus CR-A (controlled release verapamil 3 ug burst and 0.25 µg/d for 20d) reduced tibial cartilage degradation by 13% verses one dose of 3 ug verapamil (4%) or 6 doses (no reduction). Note reduction under 10% is probably within experimental error of the model. In addition, CR-A increased the amount of normal collagen whereas this was not seen with either 1× or 6× verapamil. The above results evidence the unexpected synergistic advantages of the controlled release microsphere encapsulated formulation.

Further experiments with calcium channel blockers injected into osteoarthritis patient's joints are disclosed in U.S. Pat. No. 7,767,710, with examples 1-9 from that document incorporated by reference.

In one embodiment of the present invention, a method for treating osteoarthritis comprises directly administering to the joint an effective amount of calcium-channel regulator microspheres. Administering the calcium channel regulator microspheres is preferably accomplished by direct (intraarticular) injection of a composition comprising the calcium-channel regulator microspheres into an arthritic joint. Intraarticular injection differs from other methods of administering calcium-channel regulator microspheres in that it allows biologically sufficient concentrations of calcium-channel regulator microspheres to be applied to the affected synovial tissue without the risk of producing the undesirable side-effects that can occur as the result of the higher concentrations of calcium-channel regulator microspheres by other administration techniques. Injection techniques are known to those skilled in the art. For example, a useful description for injecting the knee joint is given in "Viscosupplementation tinder Fluoroscopic Control," D. Waddell, D. Estey, D. C. Bricker, and A. Marsala, American Journal of Medicine in Sports, 4:237-241 and 249, 2001, which is incorporated by reference herein.

In one embodiment of the invention, an effective amount of calcium-channel regulator microspheres is administered to an osteoarthritic joint in a pharmaceutically acceptable composition. An "effective amount" is an amount (hat is sufficient to reduce any or all of the symptoms of osteoarthritis in the treated joint, such as inflammation, pain, stiffness and/or loss of function, and producing a minimal amount or none of the undesirable side effects resulting from an overdose of calcium-channel regulator microspheres, such as tissue death or injury, joint swelling, etc. What is an effective amount will vary depending on the ion channel, the method used for administration and the joint being treated. In some embodiments, a combination of multiple calcium channel regulators, may be effective.

According to one embodiment of the presently disclosed invention, an effective amount of calcium-channel regulator microspheres for treating osteoarthritis in accordance with the present invention using intraarticular injection may be in the range of 0.00001-10.0 mg, preferably dissolved or suspended in physiological saline or other vehicle appropriate for injection into the body. Preferred compositions comprise one or more calcium-channel regulator microspheres at a total concentration of 0.00001-2.5 mg/mL. Typically, 1-4 mL of the composition may be injected into the joint at one time, Administration of a large free dose of ion-channel regulator to a joint by intraarticular injection to synovial tissue may be likely to produce undesirable side effects resulting from the toxic effect of the ion-channel regulator on joint tissue at that level. An effective amount of ion-channel regulator used in the present invention may be an order of magnitude less than the amount of (+)-verapamil that is taught in as being effective for the treatment of rheumatoid arthritis by intraarticular injection. See, for example, Mak U.S. Pat. No. 6,190,691, col. 83, lines 35-54. As one specific example of the present invention, an effective amount of verapamil may be 0.02-0.8 mg when directly injected into an adult knee joint.

In another embodiment of the invention, calcium-channel regulator microspheres may be administered in combination with one or more other osteoarthritis treatment agents, either in separate compositions or in the same composition. Preferably, the other osteoarthritis treatment agent is in the form of an injectable composition, i.e. a composition that is suitable for being injected directly into the affected joint (intraarticular injection). The treatment method of the present invention can readily be customized to the individual patient's needs, and may be used instead of or in conjunction with other treatment modalities including but not limited to physical therapy, treatments that provide localized pain relief (heat, massage, application of liniments, etc.), and with other medications that help reduce disability, relieve pain, and improve the patient's quality of life.

Accordingly, examples of treatments contemplated by the present invention include an intraarticular injection of a composition including calcium-channel regulator microspheres followed by another intraarticular injection of another osteoarthritis treatment agent, e.g. a viscosupplement, steroid or other injectable osteoarthritis treatment agent; an intraarticular injection of a calcium-channel regulator microspheres composition followed by oral or intravenous administration of another osteoarthritis treatment agent such as a non-steroidal anti-inflammatory drug; an intraarticular injection of a single composition comprising calcium-channel regulator microspheres and at least one viscosupplement, steroid or other injectable osteoarthritis treatment agent; and so forth.

A treatment composition according to one embodiment of the invention comprises calcium-channel regulator microspheres and one or more other osteoarthritis treatment agent(s). The individual concentrations of the calcium-channel regulator microspheres and the other osteoarthritis treatment agent(s) are sufficient to provide an effective amount of each ingredient to the affected joint. Preferably, the composition comprises calcium-channel regulator microspheres at a concentration of 0.00001-2.0 mg/mL and other osteoarthritis treatment agent(s) at a concentration of 0.01-25 mg/mL.

In one embodiment, the composition is suitable for intraarticular injection in accordance with the method of the present invention, and both the calcium-channel regulator microspheres and other osteoarthritis treatment agent are "injectable". As used herein, the term "injectable" means any osteoarthritis treatment agent that is in a form suitable for intraarticular injection. In one embodiment, the injectable other osteoarthritis treatment agents may comprise at least one corticosteroid such as a glucocorticoid. As one specific non-limiting example, the composition of the present invention may comprise 1-25 mg/mL of the injectable steroid osteoarthritis treatment agent methylprednisolone acetate.

In another embodiment, the injectable other osteoarthritis treatment agent may comprise at least one viscosupplement. As used herein and in the art, the term "viscosupplement" refers to any substance that is used to restore and/or increase the cushioning and lubrication of arthritic synovial fluid by intraarticular injection Preferred viscosupplements include hylan, hyaluronic acid and other hyaluronan (sodium hyaluronate) compounds, which are natural complex sugars of the glycosaminoglycan family. Hyaluronan is a long-chain polymer containing repeating disaccharide units of Na-glucoronate N-acetylglucosamine. By way of example, commercially available hyaluronan viscosupplements include Synvisc®, Hyalgan®, Supartz®, and Orthovisc®. As one specific non-limiting example, the composition of the present invention may comprise 1-15 mg/mL of a hyaluronon compound.

Other osteoarthritis treatment agents comprising the composition of the present invention may also include those used in any modality of arthritis treatment, such as oral administration, intravenous administration, etc. Examples of other osteoarthritis treatment agents include, without limitation, non-steroidal anti-inflammatory drugs (NSAIDS) such as ibuprofen, naproxen, and COX-2 inhibitors; analgesics such as aspirin and acetaminophen; glycans, including glucosamines, e.g. glucosamine sulfate and glucosamine hydrochloride; and proteoglycans, such as chondroitin compounds, as well as various other known narcotics, steroids, antibiotics, immunomodulators, penicillamine, and the like.

The compositions of the present invention may also contain other materials such as fillers, stabilizers, coatings, coloring agents, preservatives, fragrances, and other additives known in the art. The compositions may be in liquid or gel form and may be provided in time-release formulations.

Pharmaceutical Compositions: The methods described herein can also include the administrations of pharmaceutically acceptable compositions that include the therapeutic, or a pharmaceutically acceptable salt, solvate, or prodrug thereof loaded in the microsphere and/or as a carrier for the microsphere. When employed as pharmaceuticals, any of the present compounds can be administered in the form of pharmaceutical compositions. These compositions can be prepared in a manner well known in the pharmaceutical art, and can be administered by a variety of routes, depending upon whether local or systemic treatment is desired and upon the area to be treated. While administration is preferably intraarticular, administration may be topical, parenteral, intravenous, intra-arterial, subcutaneous, intramuscular, intracranial, intraorbital, ophthalmic, intraventricular, intracapsular, intraspinal, intracisternal, intraperitoneal, intranasal, aerosol, by suppositories, or oral administration.

This invention also includes pharmaceutical compositions which can contain one or more pharmaceutically acceptable carriers. In making the pharmaceutical compositions of the invention, the active ingredient is typically mixed with an excipient, diluted by an excipient or enclosed within such a carrier in the form of, for example, a capsule, sachet, paper, or other container. When the excipient serves as a diluent, it can be a solid, semisolid, or liquid material (e.g., normal saline), which acts as a vehicle, carrier or medium for the active ingredient. Thus, the compositions can be in the form of tablets, powders, lozenges, sachets, cachets, elixirs, suspensions, emulsions, solutions, syrups, and soft and hard gelatin capsules. As is known in the art, the type of diluent can vary depending upon the intended route of administration. The resulting compositions can include additional agents, such as preservatives.

The therapeutic agents of the invention can be administered alone, or in a mixture, in the presence of a pharmaceutically acceptable excipient or carrier. The excipient or carrier is selected on the basis of the mode and route of administration. Suitable pharmaceutical carriers, as well as pharmaceutical necessities for use in pharmaceutical formulations, are described in *Remington: The Science and Practice of Pharmacy*, $22^{nd}$ Ed., Gennaro, Ed., Lippencott Williams & Wilkins (2012), a well-known reference text in this field, and in the USP/NF (United States Pharmacopeia and the National Formulary), each of which is incorporated by reference. In preparing a formulation, the active compound can be milled to provide the appropriate particle size prior to combining with the other ingredients. If the active compound is substantially insoluble, it can be milled to a particle size of less than 200 mesh. If the active compound is substantially water soluble, the particle size can be adjusted by milling to provide a substantially uniform distribution in the formulation, e.g. about 40 mesh.

Examples of suitable excipients are lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include: lubricating agents such as talc, magnesium stearate, and mineral oil; wetting agents; emulsifying and suspending agents; preserving agents such as methyl- and propylhydroxy-benzoates; sweetening agents; and flavoring agents. Other exemplary excipients are described in *Handbook of Pharmaceutical Excipients*, $8^{th}$ Edition, Sheskey et al., Eds., Pharmaceutical Press (2017), which is incorporated by reference.

The methods described herein can include the administration of a therapeutic, or prodrugs or pharmaceutical compositions thereof, or other therapeutic agents. Exemplary therapeutics include those that block or down regulate the calcium ion channel (including amlodipine, bepridil, diltiazem hypochloride, felodipine, gallopamil, isradipine, nicardipine, nifedipine, nimodipine, nitrendipine, verapamil, devapamil, and emopamil or pharmaceutically acceptable salts, solvates, esters, amides, clathrate, stereoisomers, enantiomers, prodrugs or analogs thereof).

The pharmaceutical compositions can be formulated so as to provide immediate, extended, or delayed release of the active ingredient after administration to the patient by employing procedures known in the art.

The compositions can be formulated in a unit dosage form, each dosage containing, e.g., 0.1-500 mg of the active ingredient. For example, the dosages can contain from about 0.1 mg to about 50 mg, from about 0.1 mg to about 40 mg, from about 0.1 mg to about 20 mg, from about 0.1 mg to about 10 mg, from about 0.2 mg to about 20 mg, from about 0.3 mg to about 15 mg, from about 0.4 mg to about 10 mg, from about 0.5 mg to about 1 mg; from about 0.5 mg to about 100 mg, from about 0.5 mg to about 50 mg, from about 0.5 mg to about 30 mg, from about 0.5 mg to about 20 mg, from about 0.5 mg to about 10 mg, from about 0.5 mg to about 5 mg; from about 1 mg from to about 50 mg, from about 1 mg to about 30 mg, from about 1 mg to about 20 mg, from about 1 mg to about 10 mg, from about 1 mg to about 5 mg; from about 5 mg to about 50 mg, from about 5 mg to about 20 mg, from about 5 mg to about 10 mg; from about 10 mg to about 100 mg, from about 20 mg to about 200 mg, from about 30 mg to about 150 mg, from about 40 mg to about 100 mg, from about 50 mg to about 100 mg of the active ingredient, from about 50 mg to about 300 mg, from about 50 mg to about 250 mg, from about 100 mg to about 300 mg, or, from about 100 mg to about 250 mg of the active ingredient. For preparing solid compositions such as tablets, the principal active ingredient is mixed with one or more pharmaceutical excipients to form a solid bulk formulation composition containing a homogeneous mixture of a compound of the present invention. When referring to these bulk formulation compositions as homogeneous, the active ingredient is typically dispersed evenly throughout the composition so that the composition can be readily subdivided into equally effective unit dosage forms such as tablets and capsules. This solid bulk formulation is then subdivided into unit dosage forms of the type described above containing from, for example, 0.1 to about 500 mg of the active ingredient of the present invention.

Compositions for Oral Administration: The pharmaceutical compositions contemplated by the invention include those formulated for oral administration ("oral dosage forms"). Oral dosage forms can be, for example, in the form of tablets, capsules, a liquid solution or suspension, a powder, or liquid or solid crystals, which contain the active ingredient(s) in a mixture with non-toxic pharmaceutically acceptable excipients. These excipients may be, for example, inert diluents or fillers (e.g., sucrose, sorbitol, sugar, mannitol, microcrystalline cellulose, starches including potato starch, calcium carbonate, sodium chloride, lactose, calcium phosphate, calcium sulfate, or sodium phosphate); granulating and disintegrating agents (e.g., cellulose derivatives including microcrystalline cellulose, starches including potato starch, croscarmellose sodium, alginates, or alginic acid); binding agents (e.g., sucrose, glucose, sorbitol, acacia, alginic acid, sodium alginate, gelatin, starch, pregelatinized starch, microcrystalline cellulose, magnesium aluminum silicate, carboxymethylcellulose sodium, methylcellulose, hydroxypropyl methylcellulose, ethylcellulose, polyvinylpyrrolidone, or polyethylene glycol); and lubricating agents, glidants, and antiadhesives (e.g., magnesium stearate, zinc stearate, stearic acid, silicas, hydrogenated vegetable oils, or talc). Other pharmaceutically acceptable excipients can be colorants, flavoring agents, plasticizers, humectants, buffering agents, and the like.

Formulations for oral administration may also be presented as chewable tablets, as hard gelatin capsules wherein the active ingredient is mixed with an inert solid diluent (e.g., potato starch, lactose, microcrystalline cellulose, calcium carbonate, calcium phosphate or kaolin), or as soft gelatin capsules wherein the active ingredient is mixed with water or an oil medium, for example, peanut oil, liquid paraffin, or olive oil. Powders, granulates, and pellets may be prepared using the ingredients mentioned above under tablets and capsules in a conventional manner using, e.g., a mixer, a fluid bed apparatus or a spray drying equipment.

Controlled release compositions for oral use may be constructed to release the active drug by controlling the dissolution and/or the diffusion of the active drug substance. Any of a number of strategies can be pursued in order to obtain controlled release and the targeted plasma concentration vs time profile. In one example, controlled release is obtained by appropriate selection of various formulation parameters and ingredients, including, e.g., various types of controlled release compositions and coatings. Thus, the drug is formulated with appropriate excipients into a pharmaceutical composition that, upon administration, releases the drug in a controlled manner. Examples include single or multiple unit tablet or capsule compositions, oil solutions, suspensions, emulsions, microcapsules, microspheres, nanoparticles, patches, and liposomes. In certain embodiments, compositions include biodegradable, pH, and/or temperature-sensitive polymer coatings.

Dissolution or diffusion-controlled release can be achieved by appropriate coating of a tablet, capsule, pellet, or granulate formulation of compounds, or by incorporating the compound into an appropriate matrix. A controlled release coating may include one or more of the coating substances mentioned above and/or, e.g., shellac, beeswax, glycowax, castor wax, carnauba wax, stearyl alcohol, glyceryl monostearate, glyceryl distearate, glycerol palmitostearate, ethylcellulose, acrylic resins, dl-polylactic acid, cellulose acetate butyrate, polyvinyl chloride, polyvinyl acetate, vinyl pyrrolidone, polyethylene, polymethacrylate, methylmethacrylate, 2-hydroxymethacrylate, methacrylate hydrogels, 1,3 butylene glycol, ethylene glycol methacrylate, and/or polyethylene glycols. In a controlled release matrix formulation, the matrix material may also include, e.g., hydrated methylcellulose, carnauba wax and stearyl alcohol, carbopol 934, silicone, glyceryl tristearate, methyl acrylate-methyl methacrylate, polyvinyl chloride, polyethylene, and/or halogenated fluorocarbon.

The liquid forms in which the compounds and compositions of the present invention can be incorporated for administration orally include aqueous solutions, suitably flavored syrups, aqueous or oil suspensions, and flavored emulsions with edible oils such as cottonseed oil, sesame oil, coconut oil, or peanut oil, as well as elixirs and similar pharmaceutical vehicles.

Compositions suitable for oral mucosal administration (e.g., buccal or sublingual administration) include tablets, lozenges, and pastilles, where the active ingredient is formulated with a carrier, such as sugar, acacia, tragacanth, or gelatin and glycerine.

Coatings, The pharmaceutical compositions formulated for oral delivery, such as tablets or capsules of the present invention can be coated or otherwise compounded to provide a dosage form affording the advantage of delayed or extended release. The coating may be adapted to release the active drug substance in a predetermined pattern (e.g., in order to achieve a controlled release formulation) or it may be adapted not to release the active drug substance until after passage of the stomach, e.g., by use of an enteric coating (e.g., polymers that are pH-sensitive ("pH controlled release"), polymers with a slow or pH-dependent rate of swelling, dissolution or erosion ("time-controlled release"), polymers that are degraded by enzymes ("enzyme-controlled release" or "biodegradable release") and polymers that form firm layers that are destroyed by an increase in pressure ("pressure-controlled release")). Exemplary enteric coatings that can be used in the pharmaceutical compositions described herein include sugar coatings, film coatings (e.g., based on hydroxypropyl methylcellulose, methylcellulose, methyl hydroxyethylcellulose, hydroxypropylcellulose, carboxymethylcellulose, acrylate copolymers, polyethylene glycols and/or polyvinylpyrrolidone), or coatings based on methacrylic acid copolymer, cellulose acetate phthalate, hydroxypropyl methylcellulose phthalate, hydroxypropyl methylcellulose acetate succinate, polyvinyl acetate phthalate, shellac, and/or ethylcellulose. Furthermore, a time delay material such as, for example, glyceryl monostearate or glyceryl distearate, may be employed.

For example, the tablet or capsule can comprise an inner dosage and an outer dosage component, the latter being in the form of an envelope over the former. The two components can be separated by an enteric layer which serves to resist disintegration in the stomach and permit the inner component to pass intact into the duodenum or to be delayed in release.

When an enteric coating is used, desirably, a substantial amount of the drug is released in the lower gastrointestinal tract.

In addition to coatings that effect delayed or extended release, the solid tablet compositions may include a coating adapted to protect the composition from unwanted chemical changes (e.g., chemical degradation prior to the release of the active drug substance). The coating may be applied on the solid dosage form in a similar manner as that described in *Encyclopedia of Pharmaceutical Technology*, vols. 5 and 6, Eds. Swarbrick and Boyland, 2000.

Parenteral Administration: Within the scope of the present invention are also injections and parenteral depot systems from biodegradable polymers. These systems are injected or implanted into the joint, muscle, or subcutaneous tissue and release the incorporated drug over extended periods of time, ranging from several days to several months. Both the characteristics of the polymer and the structure of the device can control the release kinetics which can be either continuous or pulsatile. Polymer-based injections and parenteral depot systems can be classified as implants or microparticles. The former are cylindrical devices injected into the subcutaneous tissue whereas the latter are defined as spherical particles in the range of 10-100 μm. Extrusion, compression or injection molding are used to manufacture implants whereas for microparticles, the phase separation method, the spray-drying technique and the water-in-oil-in-water emulsion techniques are frequently employed. Biodegradable polymers to form microparticles include polyesters from lactic and/or glycolic acid, e.g. poly(glycolic acid) and poly(L-lactic acid) (PLG/PLA microspheres). Of particular interest are in situ forming depot systems, such as thermoplastic pastes and gelling systems formed by solidification, by cooling, or due to the sol-gel transition, cross-linking systems and organogels formed by amphiphilic lipids. Examples of thermosensitive polymers used in the aforementioned systems include, N-isopropylacrylamide, poloxamers (ethylene oxide and propylene oxide block copolymers, such as poloxamer 188 and 407), poly(N-vinyl caprolactam), poly(siloethylene glycol), polyphosphazenes derivatives and PLGA-PEG-PLGA.

Pharmaceutical compositions of the present invention comprise an effective amount of one or more calcium channel regulators, included encapsulated in microspheres dissolved or dispersed in a pharmaceutically acceptable carrier. The phrases "pharmaceutical or pharmacologically acceptable" refers to molecular entities and compositions that do not produce an adverse, allergic or other untoward reaction when administered to an animal, such as, for example, a human, as appropriate. The preparation of a pharmaceutical composition that contains at least one calcium channel regulators, included encapsulated in microspheres in solution or additional active ingredient will be known to those of skill in the art in light of the present disclosure, as exemplified by "Remington: The Science and Practice of Pharmacy," 20th Edition (2000), which is incorporated herein by reference in its entirety. Moreover, for animal (for example, human) administration, it will be understood that preparations should meet sterility, pyrogenicity, general safety and purity standards as required by FDA Office of Biological Standards.

In various embodiments, the compositions of the present invention further comprise cyclodextrin. Cyclodextrins are a general class of molecules composed of glucose units connected to form a series of oligosaccharide rings (See Challa et al., 2005, AAPS PharmSciTech 6:E329-E357). In nature, the enzymatic digestion of starch by cyclodextrin glycosyltransferase (CGTase) produces a mixture of cyclodextrins comprised of 6, 7 and 8 anhydroglucose units in the ring structure (α-, β-, and γ-cyclodextrin, respectively). Commercially, cyclodextrins are also produced from starch, but different, more specific enzymes are used. Cyclodextrins have been employed in formulations to facilitate the delivery of cisapride, chloramphenicol, dexamethasone, dextromethoraphan, diphenhydramine, hydrocortisone, itraconazole, and nitroglycerin (Welliver and McDonough, 2007, Sci World J, 7:364-371). In various embodiments, the cyclodextrin of the invention is hydroxypropyl-Beta-cyclodextrin, sulfobutylether-beta-cyclodextrin, alpha-dextrin or combinations thereof. In certain embodiments, cyclodextrin may be used as a solubilizing agent.

In various other embodiments, compositions of the present invention may comprise human serum albumin purified from plasma, or recombinant human serum albumin. In certain embodiments, human serum albumin may be used as a solubilizing agent. In other embodiments, the compositions of the invention may comprise propylene glycol. In other embodiments, the compositions of the invention may comprise perfluorooctyl bromide. In other embodiments, the compositions of the invention may comprise perfluorocarbon. In certain embodiments, perfluorocarbon may be used as a solubilizing agent.

In various embodiments, a preservative or stabilizer may be included in the composition or solution. For example, the prevention of the action of microorganisms may be brought about by preservatives such as various antibacterial and antifungal agents, including but not limited to parabens (for example, methylparabens, propylparabens), chlorobutanol, phenol, sorbic acid, EDTA, metabisulfite, benzyl alcohol, thimerosal or combinations thereof. Agents which may be included suitable for use include sterile aqueous solutions or dispersions and sterile powders for the extemporaneous preparation of sterile solutions or dispersions (U.S. Pat. No. 5,466,468, specifically incorporated herein by reference in its entirety). In all cases the composition is preferably sterile and must be fluid to facilitate easy injectability. Solutions are preferably stable under the conditions of manufacture and storage and must be preserved against the contaminating action of microorganisms, such as bacteria and fungi. Examples of stabilizers which may be included include buffers, amino acids such as glycine and lysine, carbohydrates such as dextrose, mannose, galactose, fructose, lactose, sucrose, maltose, sorbitol, mannitol, etc. Appropriate stabilizers or preservatives may be selected according to the route of administration desired. A particle filter or microbe filter may be used and may be necessary according to the route of administration desired.

Administration of the disclosed compositions in a method of treatment may be achieved in a number of different ways, using methods known in the art. Such methods include, but are not limited to, topically administering solutions, suspensions, creams, pastes, oils, lotions, gels, foam, hydrogel, ointment, liposomes, emulsions, liquid crystal emulsions, and nano-emulsions.

The therapeutic and prophylactic methods of the invention thus encompass the use of pharmaceutical compositions of the invention. The formulations of the pharmaceutical compositions described herein may be prepared by any method known or hereafter developed in the art of pharmacology. In general, such preparatory methods include the step of bringing the active ingredient into association with a carrier or one or more other accessory ingredients, and then, if necessary or desirable, shaping or packaging the product into a desired single- or multi-dose unit. For example unit dose container may be such that a calcium channel regulators encapsulated in microspheres solution is contained in a crushable sealed ampoule which in turn is enclosed in protective covering on which pressure is applied to crush the ampoule which then releases a calcium channel regulators encapsulated in microspheres solution for percolation through a flint-type tip which capped the ampoule in protective covering. When such packaging configuration is employed, care is taken to leave as little as possible or ideally no headspace in ampoule for any volatile portion of the solution to escape and cause a change in solution composition over a period of shelf life.

Although the description of pharmaceutical compositions provided herein are principally directed to pharmaceutical compositions which are suitable for ethical administration to humans, it will be understood by the skilled artisan that such compositions are generally suitable for administration to animals of all sorts, including mammals. Modification of pharmaceutical compositions suitable for administration to humans in order to render the compositions suitable for administration to various animals is well understood, and the ordinarily skilled veterinary pharmacologist may design and perform such modification with merely ordinary, if any, experimentation. Subjects to which administration of the pharmaceutical compositions of the invention is contemplated include, but are not limited to, humans and other primates, mammals including commercially relevant mammals such as non-human primates, cattle, pigs, horses, sheep, cats, and dogs.

Pharmaceutical compositions that are useful in the methods of the invention may be prepared, packaged, or sold in formulations suitable for ophthalmic, vaginal, topical, intranasal, buccal, or another route of administration.

A pharmaceutical composition of the invention may be prepared, packaged, or sold in bulk, as a single unit dose, or as a plurality of single unit doses. A unit dose is discrete amount of the pharmaceutical composition comprising a predetermined amount of the active ingredient. The amount of the active ingredient is generally equal to the dosage of the active ingredient which would be administered to a subject or a convenient fraction of such a dosage such as, for example, one-half or one-third of such a dosage.

The relative amounts of the active ingredient, the pharmaceutically acceptable carrier, and any additional ingredients in a pharmaceutical composition of the invention will vary, depending upon the identity, size, and condition of the subject treated and further depending upon the route by which the composition is to be administered. By way of example, the composition may comprise between 0.1% and 100% (w/w) active ingredient.

In addition to the active ingredient, a pharmaceutical composition of the invention may further comprise one or more additional pharmaceutically active agents. Non-limiting examples of such an additional pharmaceutically active agents are fluorouracil cream, imiquimod cream, ingenol mebutate gel, diclofenac sodium gel, topical retinoids, and tirbanibulin (Klisyri) ointment.

Controlled- or sustained-release formulations of a pharmaceutical composition of the invention may be made using conventional technology.

Formulations of a pharmaceutical composition suitable for topical administration comprise the active ingredient combined with a pharmaceutically acceptable carrier, such as sterile water or sterile isotonic saline. Formulations may be prepared, packaged, or sold in unit dosage form, such as in ampules, crushable or otherwise, or in multi-dose containers containing a preservative. Formulations for topical administration include, but are not limited to, suspensions, solutions, emulsions in oily or aqueous vehicles, solutions, suspensions, creams, pastes, oils, lotions, gels, foam, hydrogel, ointment, liposomes, emulsions, liquid crystal emulsions, nanoemulsions, implantable sustained-release or biodegradable formulations. Such formulations may further comprise one or more additional ingredients including, but not limited to, suspending, stabilizing, or dispersing agents.

The pharmaceutical compositions may be prepared, packaged, or sold in the form of a sterile aqueous or oily suspension or solution. This suspension or solution may be formulated according to the known art, and may comprise, in addition to the active ingredient, additional ingredients such as the dispersing agents, wetting agents, or suspending agents described herein. Such sterile formulations may be prepared using a non-toxic acceptable diluent or solvent, such as water or 1,3-butane diol, for example. Other acceptable diluents and solvents include, but are not limited to, Ringer's solution, isotonic sodium chloride solution, and fixed oils such as synthetic mono- or di-glycerides. Other formulations that are useful include those which comprise the active ingredient in a liposomal preparation, or as a component of a biodegradable polymer system. Compositions for sustained release or implantation may comprise pharmaceutically acceptable polymeric or hydrophobic materials such as an emulsion, an ion exchange resin, a sparingly soluble polymer, or a sparingly soluble salt.

In some embodiments, the pharmaceutical compositions of the invention may be contained in a crushable ampule irrespective of the route of delivery to the patient.

It is contemplated that any embodiment discussed in this specification may be implemented with respect to any method or composition of the invention, and vice versa. Furthermore, compositions of the invention may be used to achieve methods of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

Dosing Regimes: The present methods for treating osteoarthritis are carried out by administering a therapeutic for a time and in an amount sufficient to result in decreased joint pain, joint stiffness, tenderness at or near joint, joint tenderness, loss of flexibility, grating sensation, bone spurs, and or swelling The amount and frequency of administration of the compositions can vary depending on, for example, what is being administered, the state of the patient, and the manner of administration. In therapeutic applications, compositions can be administered to a patient suffering from osteoarthritis in an amount sufficient to relieve or least partially relieve the symptoms of the osteoarthritis and its complications. The dosage is likely to depend on such variables as the type and extent of progression of the osteoarthritis, the severity of the osteoarthritis, the age, weight and general condition of the particular patient, the relative biological efficacy of the composition selected, formulation of the excipient, the route of administration, and the judgment of the attending clinician. Effective doses can be extrapolated from dose-response curves derived from in vitro or animal model test system. An effective dose is a dose that produces a desirable clinical outcome by, for example, improving a sign or symptom of the osteoarthritis or slowing its progression.

The amount of therapeutic per dose can vary. For example, a subject can receive from about 0.1 µg/kg to about 10,000 µg/kg. Generally, the therapeutic is administered in an amount such that the peak plasma concentration ranges from 150 nM-250 µM.

Exemplary dosage amounts can fall between 0.1-5000 µg/kg, 100-1500 µg/kg, 100-350 µg/kg, 340-750 µg/kg, or 750-1000 µg/kg. Exemplary dosages can 0.25, 0.5, 0.75, 1°, or 2 mg/kg. In another embodiment, the administered dosage can range from 0.05-5 mmol of therapeutic (e.g., 0.089-3.9 mmol) or 0.1-50 µmol of therapeutic (e.g., 0.1-25 µmol or 0.4-20 µmol).

The plasma concentration of therapeutic can also be measured according to methods known in the art. Exemplary peak plasma concentrations of therapeutic can range from 0.05-10 µM, 0.1-10 µM, 0.1-5.0 µM, or 0.1-1 µM. Alternatively, the average plasma levels of therapeutic can range from 400-1200 µM (e.g., between 500-1000 µM) or between 50-250 µM (e.g., between 40-200 µM). In some embodiments where sustained release of the drug is desirable, the peak plasma concentrations (e.g., of therapeutic) may be maintained for 6-14 hours, e.g., for 6-12 or 6-10 hours. In other embodiments where immediate release of the drug is desirable, the peak plasma concentration (e.g., of therapeutic) may be maintained for, e.g., 30 minutes.

The frequency of treatment may also vary. The subject can be treated one or more times per day with therapeutic (e.g., once, twice, three, four or more times) or every so-many hours (e.g., about every 2, 4, 6, 8, 12, or 24 hours). Preferably, the pharmaceutical composition is administered 1 or 2 times per 24 hours. The time course of treatment may be of varying duration, e.g., for two, three, four, five, six, seven, eight, nine, ten or more days. For example, the treatment can be twice a day for three days, twice a day for seven days, twice a day for ten days. Treatment cycles can be repeated at intervals, for example weekly, bimonthly or monthly, which are separated by periods in which no treatment is given. The treatment can be a single treatment or can last as long as the life span of the subject (e.g., many years).

Kits: Any of the pharmaceutical compositions of the invention described herein can be used together with a set of instructions, i.e., to form a kit. The kit may include instructions for use of the pharmaceutical compositions as a therapy as described herein, with the instructions being provided either as a hard copy, such as printed on paper, and/or as directions to access the instructions electronically, such as a web address or QR code to a website where the instructions are provided. For example, the instructions may provide dosing and therapeutic regimes for use of the compounds of the invention to reduce symptoms and/or underlying cause of the osteoarthritis.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. The present disclosure also contemplates other embodiments "comprising," "consisting of" and "consisting essentially of," the embodiments or elements presented herein, whether explicitly set forth or not. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items, while only the terms "consisting of" and "consisting only of" are to be construed in the limitative sense.

We claim:

1. A method for treating osteoarthritis in a patient in need thereof comprising: administering once to the patient an effective dose of a pharmaceutical composition comprising verapamil or a pharmaceutically acceptable salt thereof, wherein the verapamil is encapsulated in poly lactic/glycolic acid (PLGA) microspheres, and wherein the pharmaceutical composition is formulated for an initial burst between 0.01 ug to 5.00 ug of verapamil or a pharmaceutically acceptable salt thereof, followed by a lower concentration extended release of verapamil or a pharmaceutically acceptable salt thereof, between 0.05 ug and 25.00 ug a day, wherein between 85.0% and 95% of the microspheres are between 6.00 µm and 100.00 µm in diameter and further wherein the microspheres release verapamil for about one month after administration.

2. The method of claim 1, wherein the initial burst is about 3 ug.

3. The method of claim 1, wherein the lower concentration extended release dose is 0.25 ug per day.

4. The method of claim 1, wherein the composition is administered intraarticularly into an arthritic joint.

5. The method of claim 4, wherein the joint is one of a hip joint, a joint of a foot and/or an ankle, a knee joint, a joint of a hand, a joint of the spine, and a shoulder joint.

6. The method of claim 1 wherein the pharmaceutically acceptable composition further comprises a vehicle appropriate for injection into the body.

7. The method of claim 6, wherein the vehicle comprises physiological saline.

8. The method of claim 7, wherein the vehicle further includes a second calcium channel blocker that is not encapsulated in the microspheres.

9. The method of claim 8, wherein the amount of second calcium channel blocker is between about 0.5-2.0 mg.

10. The method of claim 9, wherein a ratio of the verapamil to the second calcium channel blocker is between 0.250 and 4.000.

11. The method of claim 1, further comprising administering a second therapeutic, wherein the second therapeutic is not a calcium channel blocker.

12. The method of claim 11, wherein the second therapeutic is hyaluronic acid, the second therapeutic is included in the pharmaceutical composition, and further comprising injecting the pharmaceutical composition into an intraarticular space of a joint of the patient.

13. The method of claim 1, wherein 90.0% of the microspheres are between 20.00 µm and 55.00 µm in diameter.

14. A pharmaceutical composition comprising: a plurality of microspheres; between 0.001 mg and 25 mg of verapamil hydrochloride salt; at least a first portion of the verapamil is freeze dried or vacuum dried, and the first portion is encapsulated in the microspheres; between 85.0% and 95% of the microspheres are between 6.00 µm and 100.00 µm in diameter; and the microspheres comprise poly lactic/glycolic acid (PLGA), poly lactic acid (PLA), poly ethylene glycol (PEG), or a combination thereof.

15. The pharmaceutical composition of claim 14, wherein the verapamil hydrochloride salt is encapsulated in PLGA microspheres, and wherein the microspheres are between about 20.00 um and 55.00 um in diameter.

16. The pharmaceutical composition of claim 15, wherein said composition further comprises a vehicle for injection into a human body.

17. The pharmaceutical composition of claim 15, wherein the pharmaceutical composition further comprises mannitol and/or carboxymethylcellulose.

* * * * *